May 31, 1927.  
W. BAIER  
TOOL  
Filed Feb. 14, 1925
1,630,414
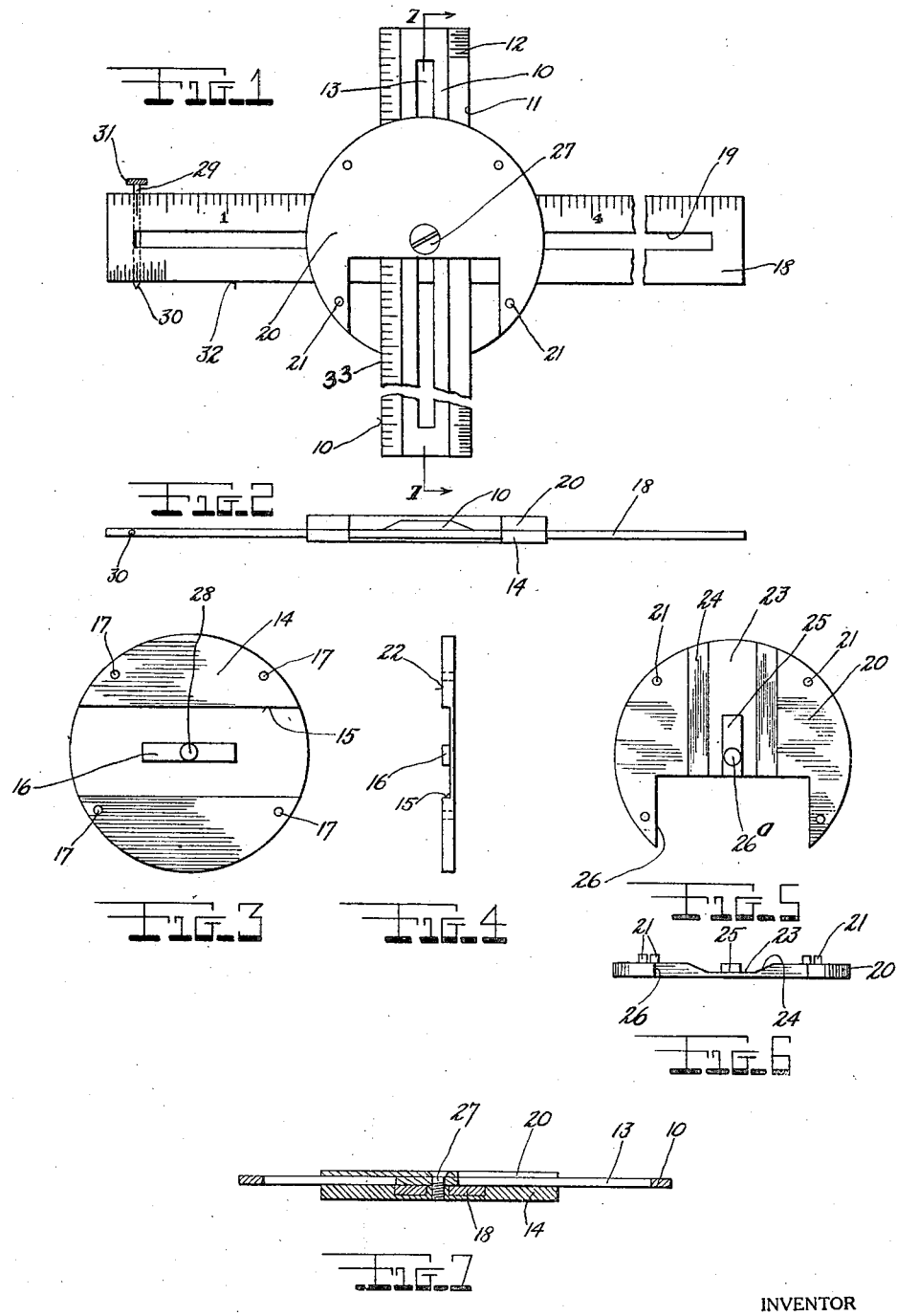
INVENTOR  
W. Baier  
BY  
ATTORNEY Patented May 31, 1927.

1,630,414

UNITED STATES PATENT OFFICE.

WALTER BAIER, OF NEW YORK, N. Y.

TOOL.

Application filed February 14, 1925. Serial No. 9,117.

The main object of this invention is to provide a measuring tool useful in the mechanical trades and its purpose is to provide disks having scales slidably mounted at right angles to each other which plot the distance between two positions located on surfaces at right angles to each other.

Another object is to provide a tool as stated having a pair of intersecting scales thereon which may be adjusted so as to extend in any position desired from the point of intersection.

The above and other objects will become apparent in the description below, in which characters of reference refer to like-named parts in the drawing.

Referring briefly to the drawing, Figure 1 is a top plan view of the measuring tool.

Figure 2 is a side elevational view of the same.

Figure 3 is a top plan view of the disk body in which one of the scales is housed and guided.

Figure 4 is a side elevational view of Figure 3.

Figure 5 is a top plan view of the sighting disk of the tool.

Figure 6 is a side elevational view of Figure 5.

Figure 7 is a sectional elevational view taken on line 7—7 of Figure 1.

Referring in detail to the drawing, the numeral 10 indicates the vertical measuring scale of the tool. This vertical scale is provided with bevelled longitudinal edges 11 on which graduations 12, indicative of linear distances are graduated. Intermediate the width of the scale and extending longitudinally thruout the greater length of said scale is a channel 13.

An annular disk 14 forms the base or carrying body of the tool and is provided with a relatively wide channel 15 intermediate the width of which a rectangular lug 16 rises. This lug is a longitudinal block and extends parallel to the channel and is approximately of the same length as the width of the scale 10. This carrying base 14 is provided with a plurality of holes 17, the purpose for which will be more fully hereinafter described. An additional scale 18, which differs only from the scale 10 in that the former is provided with flat surfaces and the latter scale with inclined or bevelled edges, is slidably mounted in the channel 15 and is provided with a longitudinal slot 19 in which the lug 16, integral with the base plate 14, fits snugly. A sighting disk 20 of the same proportions as the disk 14 is provided with a plurality of pins 21 and is adapted to lie upon the surface 22 of the disk 14, the pins 21 of the disk 20 being received in the holes 17 formed in the disk 14. The sighting disk 20 is provided with a vertical depressed channel 23 whose sides 24 are inclined, and intermediate the width of the channel, a lug 25 is provided thru which an opening $26^a$ courses. The space bounded by the inclined edges 24, the bottom of the channel plate, and the surface 22 of the disk 14, is adapted to receive the scale 10 slidably and the guide lug 25 is received in the portion 13 of the scale 10 and serves to guide the latter in a vertical plane. The sighting disk 20 has a rectangular recess 26 at its lower end which exposes a greater portion of the vertical scale 10 than would be the case were the sighting disk a complete annular plate. The disks are retained in coupled position by a screw 27 which passes thru the opening $26^a$ in the disk 20 and engages a threaded hole 28 formed in the lug 16 of the carrying disk 14. One end of the horizontal scale 18 is provided with a pair of aligned threaded openings which pass entirely across its width at the end of the portion 19 and are adapted to receive a threaded spindle 29 having a pointed lower end 30 and a knurled head 31.

The scales 10 and 18 may be adjusted in their particular planes to any desired length from the point of intersection according to the length of the slots 19 and 13. When it is desired to calibrate a linear dimension on a plane which lies at right angles to another plane, the screw 27 is loosened so that the scales 10 and 18 are capable of being moved or slid independently and freely. Assuming that the base point lies two inches below the edge 32 of the scale 18, the scale 10 is shifted until the graduation indicating two inches on the scale 10 is intersected by the edge 32 of the scale 18. Again assuming that another calibration upon another plane is necessary, the horizontal scale 18 is moved until the required distance is had between the point 30 of the spindle 29 and the edge 33 of the scale 10, that is, the linear dimensions, indicative of the calibration desired, are proven when the desired graduations intersect each other at the point of intersection of the scales 10 and 18. After the scales 10 and 18 have been moved to their desired positions to indicate measurements to be taken on two opposite and right angle planes, the screw 27 is screwed down so that the base disk 14 and sighting disk 20 are drawn into mutual contact and lock the scales 10 and 18 between these disks so that no movement is possible.

I claim:—

1. A tool comprising a base disk, a scale therein, said base disk having a recess receiving said scale, a sighting disk having a recess therein, said sighting disk mounted on said base disk, means securing the sighting disk to the base disk, and an additional scale slidably mounted in the sighting disk and lugs on said disks guiding said scales in longitudinal movement.

2. A tool comprising a circular base disk, said base disk having a channel passing therethru in one plane, a lug extending upwardly intermediate the width of the channel, a scale having a longitudinal slot therein, said lug being adapted to register in said slot and form a guide for the scale, a sighting disk mounted on the base disk, means on said disks for positioning the sighting disk on the base disk, an additional scale slidably mounted in said sighting disk and extending at right angles to the first-named scale, bevelled edges on said second-named scale, said scale having means cooperating with the sighting disk for guiding the movement of said scale at right angles to the other scale.

3. A tool comprising a circular base disk, said base disk having a channel passing therethru, a lug extending upwardly intermediate the width of the channel, a scale having a longitudinal slot therein, said lug being adapted to register in said slot and form a guide for the scale, a sighting disk mounted on the base disk, means on said disks for positioning the sighting disk on the base disk, an additional scale slidably mounted in said sighting disk, bevelled edges on said last-named scale, an intersecting channel formed in the sighting disk and having inclined sides, the last-named scale being adapted to slide in said bevelled channel, a slot in the last-named scale, a lug in the last-named channel adapted to be received in said slot of said sighting disk, a rectangular recess exposing the intersection of the scales, and a pointed stud threadably engaged in the first-named scale and adapted to serve as a marker for indicating linear dimensions from the point of intersection in said scales.

In testimony whereof I affix my signature.

WALTER BAIER.